United States Patent
Cheng

(10) Patent No.: US 10,813,349 B1
(45) Date of Patent: Oct. 27, 2020

(54) APPARATUS AND METHOD FOR ERADICATING MOSQUITO EGGS

(71) Applicant: Logan Cheng, Chandler, AZ (US)

(72) Inventor: Logan Cheng, Chandler, AZ (US)

( * ) Notice: Subject to any disclaimer, the term of this patent is extended or adjusted under 35 U.S.C. 154(b) by 0 days.

(21) Appl. No.: 16/915,705

(22) Filed: Jun. 29, 2020

Related U.S. Application Data

(60) Provisional application No. 62/940,636, filed on Nov. 26, 2019.

(51) Int. Cl.
  *A01M 1/02* (2006.01)
  *A01M 1/06* (2006.01)
  *A01M 1/10* (2006.01)

(52) U.S. Cl.
  CPC ............ *A01M 1/106* (2013.01); *A01M 1/02* (2013.01); *A01M 1/06* (2013.01)

(58) Field of Classification Search
  CPC .............................. A01M 1/106; A01M 1/02
  USPC ....................................................... 43/132.1
  See application file for complete search history.

(56) References Cited

U.S. PATENT DOCUMENTS

| | | | |
|---|---|---|---|
| 1,772,729 A | 8/1930 | Pisani | |
| 3,997,999 A * | 12/1976 | Evans | A01M 1/02 43/107 |
| 4,328,636 A | 5/1982 | Johnson | |
| 5,896,697 A | 4/1999 | Kang | |
| 6,708,443 B2 | 3/2004 | Hall | |
| 6,990,768 B1 | 1/2006 | Boston | |
| 7,134,238 B2 * | 11/2006 | Forehand | A01M 1/106 43/122 |
| 7,694,455 B1 | 4/2010 | Bowden et al. | |
| 8,844,465 B2 | 9/2014 | Holland et al. | |
| 2002/0156584 A1 * | 10/2002 | Sullivan | A01M 1/106 702/19 |
| 2006/0086037 A1 * | 4/2006 | Roberts | A01M 1/12 43/107 |
| 2009/0277076 A1 * | 11/2009 | Boston | A01M 1/12 43/132.1 |
| 2012/0017834 A1 * | 1/2012 | Holland | A01M 1/106 119/6.5 |

(Continued)

FOREIGN PATENT DOCUMENTS

| | | | | |
|---|---|---|---|---|
| CA | 2760919 A1 * | 6/2013 | ............ | A01M 1/02 |
| GB | 2537437 B | 10/2017 | | |

(Continued)

*Primary Examiner* — Christopher P Ellis
(74) *Attorney, Agent, or Firm* — Knobbe, Martens, Olson & Bear LLP

(57) ABSTRACT

An apparatus for controlling mosquito populations by eradicating mosquito eggs. The apparatus consists of a spawning tank, a multi-purpose spawning tank cover, a confining chamber, a water refilling chamber and a water pump. The apparatus can be set to operate either in automated mode or in manual mode. In the automated operation mode, a timer-controlled water pump transfers mosquito eggs from the spawning tank to the confining chamber where the mosquito eggs are trapped and drowned. In the manual operation mode, the cover of the spawning tank is used as a depressor bowl and the spawning tank functions as a confining chamber. Experimental results show that the mosquito egg eradicating apparatus can effectively eradicate 90% of field mosquito eggs in four hours.

15 Claims, 7 Drawing Sheets

(56) References Cited

U.S. PATENT DOCUMENTS

| | | | | |
|---|---|---|---|---|
| 2015/0173340 A1* | 6/2015 | Bernhardt | ............ | A01M 1/106 43/122 |
| 2016/0128314 A1* | 5/2016 | Hauptmann | ............ | A01N 59/04 43/125 |
| 2017/0231210 A1* | 8/2017 | Lillamand | ............ | A01M 1/023 43/107 |
| 2020/0022354 A1* | 1/2020 | Beaudoin | ............ | A01M 1/106 |

FOREIGN PATENT DOCUMENTS

| | | | | |
|---|---|---|---|---|
| WO | WO-2009058101 A1 * | 5/2009 | ............ | A01M 1/106 |
| WO | WO 2011/101871 A2 | 8/2011 | | |
| WO | WO 2013/082700 A1 | 6/2013 | | |
| WO | WO-2015111007 A1 * | 7/2015 | ............ | A01M 1/106 |

* cited by examiner

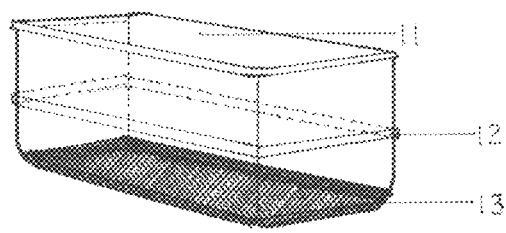
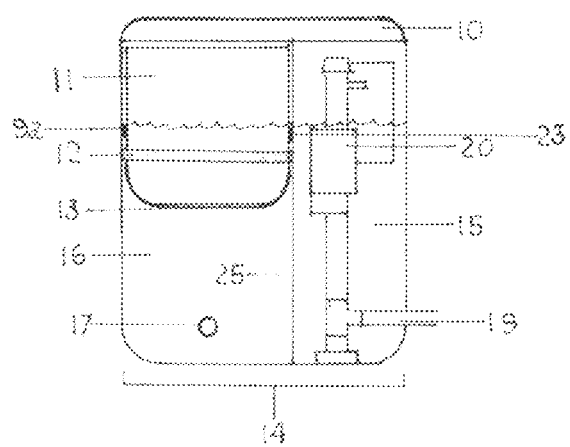
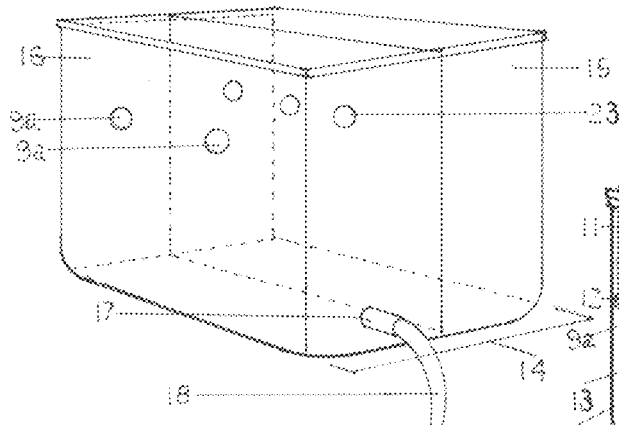
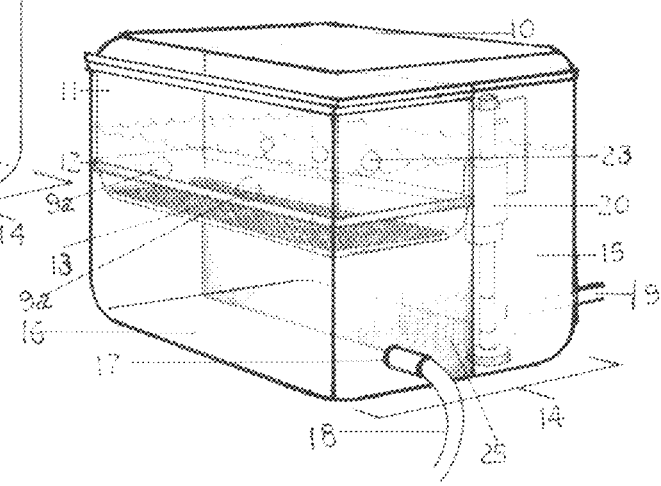

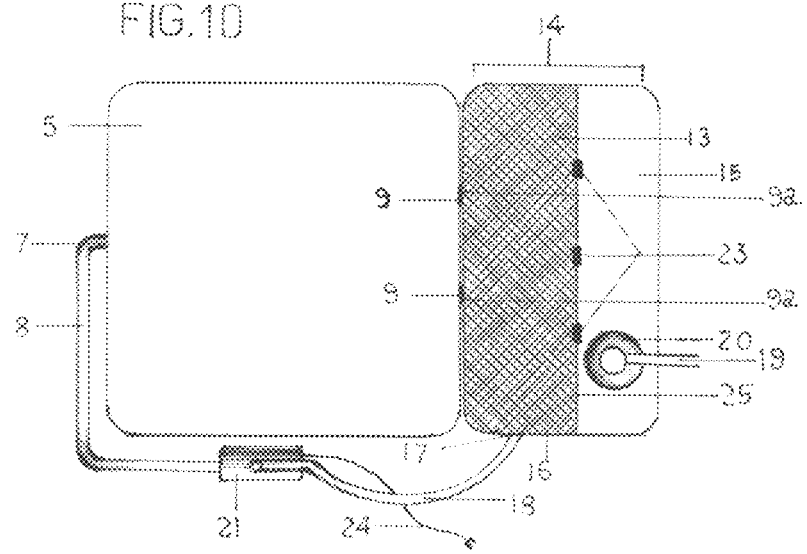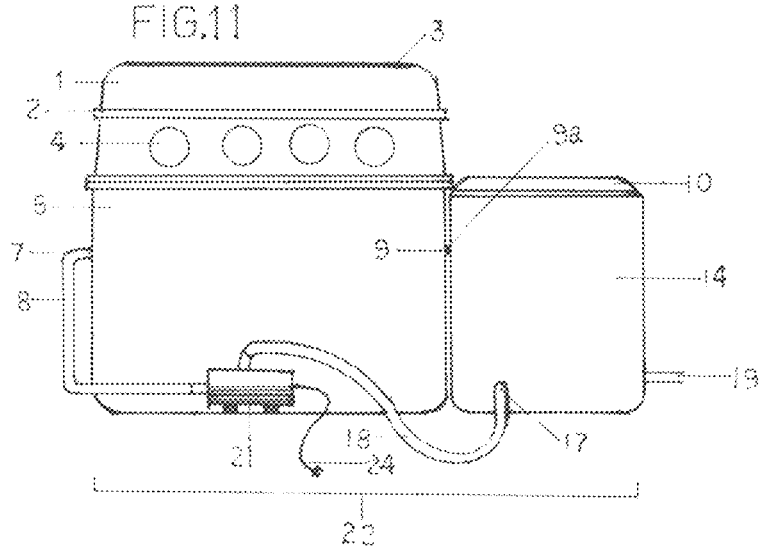

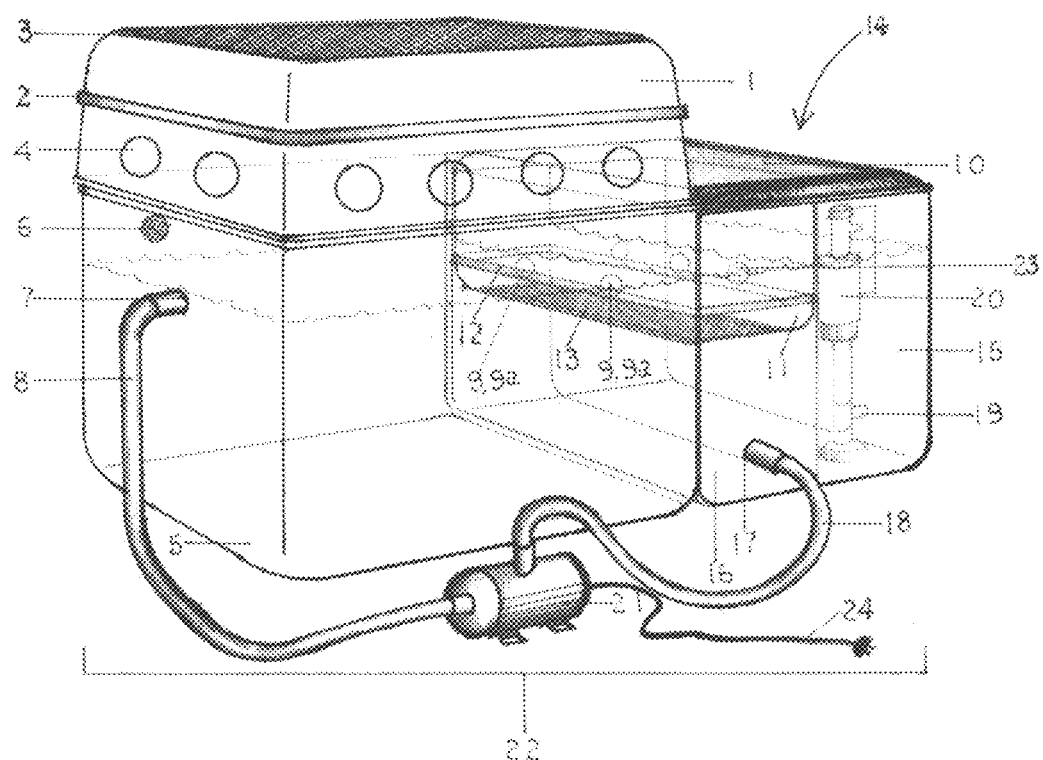

APPARATUS AND METHOD FOR ERADICATING MOSQUITO EGGS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to eradicating mosquito eggs, and more particularly to an apparatus and method for eradicating mosquito eggs.

Description of the Related Art

Mosquitoes have been named as the most dangerous animals to human beings. According to one report (Smithsonian, June 2016), mosquitoes annually kill over 725,000 human beings worldwide by transmitting deadly diseases to humans. To prevent the spreading of mosquito transmitted diseases, many products have been developed to control mosquito populations. These products can be divided into two general groups, e.g., the mosquito repelling products and the mosquito eradicating products.

Mosquito repelling products are developed to fend off mosquitoes. They do not reduce the total numbers of mosquitoes in a specific environment. Mosquito repelling products include sprays and rub solutions containing citronella, rosemary, eucalyptus and other odorous plant extracts that mosquitoes avoid.

On the other hand, mosquito eradicating products are developed to kill mosquitoes. These products include sprays of malathion and pyrethroid, electric zappers, large fan box, BTI (*Bacillus thuringiensis israelensis*) containing tablets, trapping devices and others. Some of the mosquito eradicating products, such as electric zappers and large fan box also kill a variety of other flying insects which may play important roles in plants fertilization. Malathion and pyrethroid sprays are insecticides which have the potentials of producing insecticide-resistant mosquitoes in long term applications.

One early insect trapping device was developed in 1929 (U.S. Pat. No. 1,772,729) to trap and kill flying insects. The device consists of an empty glass vase and a cone-shaped funnel made of mesh screen placed on the mouth of the glass vase. When adult flying insects enter the glass vase through the narrow opening of the funnel, they are trapped in the glass vase and cannot find their way out. Water is then poured into the glass vase to drown the trapped insects inside. This trapping and drowning process takes 3-steps, (1) set up a wide entrance opening to an outside atmosphere, (2) the wide entrance opening gradually narrows in diameter and becomes a small tunnel with an opening leading to an enclosed space, and (3) killing trapped insects in the enclosed space. This three-step trapping process is used in several later mosquito trapping apparatuses. Each mosquito trapping apparatus is developed with a specific goal. Some trapping apparatuses are designed to kill adult mosquitoes while others kill premature mosquitoes. Still other mosquito trapping apparatuses are developed to kill mosquitoes by specific eradicating mechanisms, such as drying and starvation, or by smothering, or by scavenging birds and fish. Water pools have been used to attract mosquitoes instead of vacant flasks or spaces. Heat, UV light, and carbon dioxide producing chemical compounds, e.g. yeast and sugar, have been used to attract mosquitoes to the insect trapping devices. New features are continuously being developed and added to mosquito trapping devices to improve the control efficiencies of mosquito populations.

SUMMARY

In accordance with one aspect of the disclosure, an improved apparatus and method for trapping and eradicating mosquito eggs is provided. The improved mosquito egg eradicating apparatus capitalizes on the unique characteristics of mosquito eggs. Unlike mosquito larvae and mosquito pupae which are individual swimmers, mosquito eggs are groups of eggs bounding together to form a raft floating on water surface. Each mosquito egg raft consists of hundreds of non-feeding individual eggs. These characteristics of mosquito eggs require different features in developing an apparatus for controlling populations of adult mosquitoes, mosquito larvae or pupae in a specific environment.

In accordance with another aspect of the disclosure, an apparatus and method for controlling mosquito populations by eradicating mosquito eggs is provided. The apparatus includes three components: (1) a spawning tank with a specific cover for female mosquitoes to lay eggs in, (2) a water recycling tank where mosquito eggs are filtered out and any lost water is replenished, and (3) a water pump that moves water from spawning tank to the water recycling tank and back to the spawning tank. The apparatus can be of different sizes and shapes. Small apparatuses can be used in private household backyards and large apparatuses can be used in public fields or ponds.

Advantageously, the apparatus described herein can effectively control mosquito populations of an environment by eradicating the mosquito eggs in that environment.

In another aspect of the disclosure, the apparatus can be operated either automatically or manually. When situations arise that disrupt the electricity supply to the apparatus for automated operation mode, the apparatus can be operated in the manual mode.

In still another aspect of the disclosure, the apparatus can be operated with minimum manpower supervision by equipping the apparatus with a water refilling device, or a fill valve, which can automatically add new water to the apparatus. The water level of the spawning tank gradually recedes due to evaporation. The low level of water in the apparatus may cause damage to the water pump. The fill valve in a water refilling chamber will prevent such damaging events from happening by adding new water to the apparatus when the water level falls below a certain level. The water refilling chamber can be an integral part of the water recycling tank, which can be securely flanged to the spawning tank with bulkhead or other fittings.

In yet another aspect of the disclosure, the apparatus may be used both on land and floating platforms on water. When used on land, the water pump of the apparatus is powered either by an electric outlet or by a battery powered by a solar panel. When used on water, the water flow between spawning tank and water recycling tank is accomplished by a battery powered water pump. A second water pump is used in conjunction with a float switch which turns on the water pump when water level drops below the outflow port(s) of the spawning tank.

In still another aspect of the disclosure, the apparatus has a removable depressor bowl which functions as the cover of the confining chamber. The underside of the depressor bowl is fixed with a fine mesh screen which keeps mosquito eggs in the confining chamber while letting water flows back to the spawning tank. The depressor bowl may be momentarily removed for cleaning of the water-recycling tank.

In accordance with another aspect of the disclosure, a mosquito egg eradicating apparatus is provided. The apparatus comprises a spawning tank fillable with water, a multi-purpose cover configured to be disposed on the spawning tank, a water pump and a water recycling tank having a mosquito egg confining chamber and a water refill chamber. The water pump is configured to move mosquito eggs from the spawning tank to the confining chamber in the water recycling tank to drown the mosquito eggs.

In accordance with another aspect of the disclosure, a mosquito egg eradicating apparatus is provided. The apparatus comprises a spawning tank fillable with water and configured to provide a spawning ground for adult mosquitoes to lay eggs in, and a multi-purpose cover configured to be disposed on the spawning tank. The cover comprises one or more entry openings via which adult mosquitoes can enter the spawning tank to lay eggs therein, and a screen mesh on a surface thereof configured to provide shade to the spawning tank and inhibit debris from falling into the spawning tank when the cover is disposed on the spawning tank. The cover also comprises a gasket disposed at least partially about a circumference of the cover at a location above the entry openings, the gasket configured to engage an inner surface of the spawning tank to inhibit mosquito eggs from floating to a water surface through the crevasse between a wall of the spawning tank and the cover. The spawning tank cover is configured to be at least partially inserted into the spawning tank when the apparatus is operated in manual mode, the screen configured to trap mosquito eggs below the water level in the spawning tank to drown the mosquito eggs.

With these and other objects in view, embodiments of the present disclosure will now be described hereinafter, by way of example only, with reference to the accompanying drawings, of the components of the apparatus.

BRIEF DESCRIPTION OF THE DRAWINGS

FIG. 5 is a schematic perspective view of the cover (10) of the water recycling tank (FIG. 9).

FIG. 6 is a schematic perspective view of the depressor bowl (11) sized to fit into the confining chamber (FIG. 8).

FIG. 7 is a schematic perspective view of the water recycling tank (14) showing water outflow ports (9a) connecting to the spawning tank. Fill valve (20) adds new water to the water recycling tank through water inflow port(s) (23).

FIG. 8 is a schematic side view of the water recycling tank (14) with depressor bowl (11) placed inside the confining chamber (16) and the fill valve (20) inside the water refilling chamber (15).

FIG. 9 is a schematic perspective view of the components of the water recycling tank (14). The components include a cover (10), a confining chamber (16), a depressor bowl (11), a water refilling chamber (15) with a fill valve inside (20), one water inflow port (17) to the confining chamber (15).

FIG. 10 is a schematic top view of the apparatus showing the affixation of the water recycling tank (14) to spawning tank (5) with bulkhead fittings (not shown in the drawing) or other mechanism at the water inflow port (9) of the spawning tank and water out flow ports (9a) of the water recycling tank.

FIG. 11 is a schematic side view of the mosquito egg eradicating apparatus showing the water recycling tank (14) is affixed to the spawning tank (5) with bulkhead fittings (not shown in the drawing) at the water flow port(s)(9, 9a).

FIG. 12 is schematic a perspective view of the mosquito egg eradicating apparatus in the automated operation mode.

DETAILED DESCRIPTION

Figure 1:
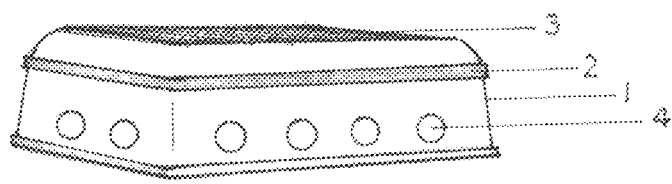
FIG. 1 is a schematic perspective view of the spawning tank cover of the mosquito egg eradicating apparatus.

The present disclosure describes an apparatus (22) and method for controlling mosquito populations by entrapping and drowning mosquito eggs. The apparatus (22) (see FIG. 12) can have a spawning tank (5) (see FIG. 2), a multifunctional cover (1) (see FIG. 1) for the spawning tank (5), a water pump (21), a water recycling tank (14) (see FIG. 8) having a confining chamber (16), a depressor bowl (11), a water refilling chamber (15) and a fill valve (20). The water pump (21) can be powered via an electric outlet or a battery (e.g., a rechargeable battery connected to a solar panel).

FIG. 1 shows the spawning tank cover (1). In the illustrated implementation, the cover (1) has one or more mosquito entry openings (4), a gasket (2) above the entry openings (4), and a fine meshed screen (3) on at least a portion of a top of the cover (1). Mosquitoes enter the spawning tank (5) (see FIG. 2) through the entry openings (4) on the cover (1) to lay eggs. The gasket (2) seals the crevasse between the wall of spawning tank and the wall of cover (1) during times when the apparatus is used in the manual mode, which is described further below. The fine meshed screen (3) is fixed on the top of the cover (1) and can serve four functions. Firstly, the screen (3) provides a shade to the spawning tank (FIG. 2) for attracting mosquitoes to the spawning tank to lay eggs. It is a known fact that mosquitoes are drawn to shaded areas and avoid sunny areas. Secondly, the mesh screen (3) inhibits (e.g., prevents) tree leaves and other airborne debris from falling into the spawning tank (FIG. 2) causing blockage of water flow at outflow port (7) (see FIG. 2). Thirdly, it can be used to filter out filamentous algae and unwanted living organisms when cultured green waters are added to the spawning tank through the screen mesh on the top of the cover. Fourthly, the mesh screen on the cover can be used to remove all accumulated dead mosquito bodies together with living mosquito eggs or other premature mosquitoes, if any, when cleaning of the spawning tank becomes necessary periodically.

Figure 2:
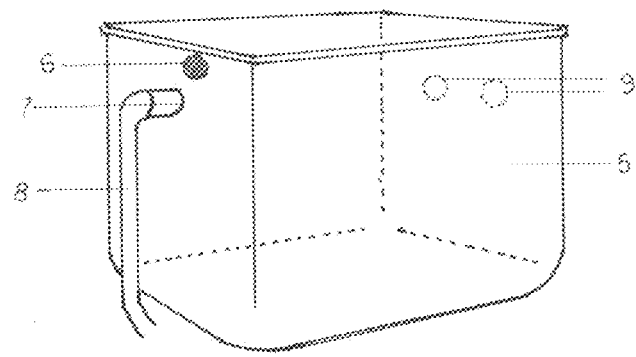
FIG. 2 is a schematic perspective view of the spawning tank of the mosquito egg eradicating apparatus without the cover.

With reference to FIG. 2, the spawning tank (5) of the apparatus (22) can be made of polyethylene (HDPE) or other weather-proof materials such as acrylic, polypyrene and others. Other suitable materials can be used. The spawning tank (5) can be made of dark colored materials and in sizes and shapes suitable for suitable locations. The spawning tank (5) is equipped with an outflow port (7) and a water tubing (8) which carry the outflow water to the confining chamber (FIG. 12). An opening above the outflow port (7) serves as an overflow opening (6) that allows excess water to flow out from the spawning tank (5) during raining events. One or more inflow ports (9), located for example on the opposite side of the outflow port (7), are for receiving water from the water recycling tank (FIG. 12).

Figure 3:
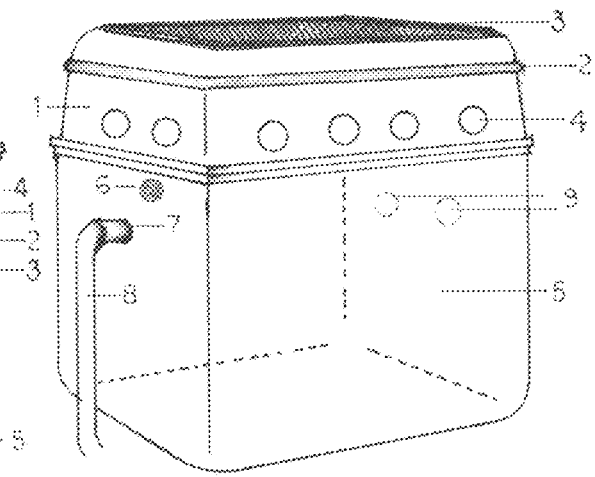
FIG. 3 is a schematic perspective view of the mosquito egg eradicating apparatus with the spawning tank cover placed on the spawning tank.

FIG. 3 shows the setup of the spawning tank (5) and the spawning tank cover (1), when the apparatus (22) is used in the automated operation mode.

Figure 4:
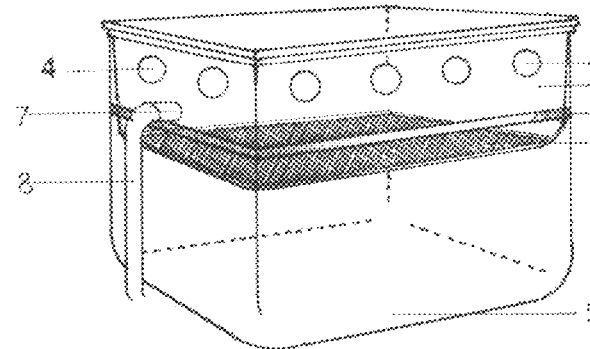
FIG. 4 is a schematic perspective view of the apparatus showing the manual operating mode with the inverted tank cover (FIG. 1) depressed into the spawning tank (FIG. 5). The screen fixed at the bottom of the tank cover has mesh openings of about 1 mm, or about one-fifth the sizes of aqueous phase mosquitoes.

With reference to FIG. 4, an inverted spawning tank cover (1) is at least partially disposed in (e.g., extends into) the spawning tank (5) when the apparatus (22) is used in the manual operation mode. At times of power failure or malfunction of the water pump (21) (see FIG. 12), the apparatus (22) can be manually operated. This is done by inverting the spawning tank cover (1) and pressing it under the water surface of the spawning tank (5). In this situation, the spawning tank (5) also functions as a confining chamber where mosquito eggs are entrapped and drowned.

FIG. 5 shows a cover (10) of the water recycling tank (14) (FIG. 8). The cover (10) inhibits (e.g., prevents) air debris or tree leaves from falling into the water recycling tank (14) (FIG. 8).

FIG. 6 shows a depressor bowl (11) which has a fine meshed screen (13) fixed to the bottom of the depressor bowl. Mosquito eggs laid in the spawning tank (5) (see FIG. 2) are transported by the action of a water pump (21) (see FIG. 12) to the confining chamber (16) (see FIG. 8) where mosquito eggs are retained below the fine meshed screen (13) of the depressor bowl (11). A gasket (12) (e.g., made of compressible materials) is affixed around a circumference of the depressor bowl (11) above the meshed screen (13) to seal the crevasse between the wall of the confining chamber (16) (see FIG. 8) and the wall of the depressor bowl (11), as shown in FIG. 9.

FIG. 7 is a perspective view of the water recycling tank (14) which contains the confining chamber (16) and a water refilling chamber (15). The water discharged from the spawning chamber (5) (see FIG. 3) flows into the confining chamber (16) through the water inflow tubing (18) and the water inflow port (17). One or more water outflow openings (9a) on the side of the water recycling tank (14) are connected to the inflow port(s) (9) (see FIG. 3) of the spawning tank (5) with a bulkhead (not shown in the drawing) or other fittings.

FIG. 8 is the side view of the water recycling tank (14). The cover (10) is placed on the top of the water recycling tank (14) to inhibit (e.g., prevent) airborne debris from falling into the water recycling tank 914). The water recycling tank (14) has a confining chamber (16) and a water refilling chamber (15) separated by a dividing wall (25) with waterflow openings (23) on the dividing wall (25). The removable depressor bowl (11) with a meshed screen (13) fixed on at least a portion of its bottom is pressed into the confining chamber (16) to serve as a top for the confining chamber (16). The discharged water from the spawning tank (5) (see FIG. 3) is directed into the confining chamber (16) by the water pump (21) (see FIG. 12) through the water inflow port (17). Mosquito eggs contained in the discharged water that flows into the confining chamber (16) via the inflow port (17) are retained below the mesh screen (13) while allowing the water passing through mesh screen and back to the spawning tank (5) (see FIG. 3) through the outflow port(s) (9a). The gasket (12), which can be compressible, advantageously inhibits (e.g., prevents) the trapped mosquito eggs in the confining chamber (16) from floating to the water surface between the walls of the confining chamber (16) and the depressor bowl (11), thereby drowning the mosquito eggs. In one implementation, a fill valve (20) can be fixed inside the water refilling chamber (15) (e.g., a float that opens the fill valve when the water level drops below a certain level and closes the fill valve when the water level is at or above a certain level). As the water level gradually recedes in the confining chamber (16) and refilling chamber (15), such as due to evaporation, the fill valve (20) can automatically open (e.g., via a float that causes the fill valve to open when the water level drops below a predetermined level) to allow additional water to flow into the refilling chamber (15), and therefore into the water recycling tank (14) and the spawning tank (5). The water supply line (19) may get its water either from a water tank or a garden water hose tapped into the main water line.

FIG. 9 is a perspective view of the water recycling tank (14). The water pump (21) (see FIG. 10) pushes the outflow water from the spawning tank (5) (see FIG. 3) into the water recycling tank (14) through the inflow tubing (18). Mosquito eggs are entrapped under the mesh screen (13) in the confining chamber (16), the water flows through the mesh screen and back to the spawning tank (5) (see FIG. 3) through the water outflow ports (9a) which are connected to the inflow ports (9) of the spawning tank (5). In one implementation, the water recycling tank (14) and the spawning tank (5) are affixed together by bulkhead fittings or other suitable mechanisms (e.g., uniseal and other conduit fittings). The fill valve (20) of the water refilling chamber (15) automatically adds new water into the water recycling tank (14) when water level drops below the level of the water outflow ports (23, 9a). A divider (25) with water flow openings (23) separates the confining chamber (16) and water refilling chamber (15). The primary function of the depressor bowl (11) is to filter out mosquito eggs from the discharged water from the spawning tank (5) (see FIG. 3). The water pump (21) (see FIG. 10) moves water from the spawning tank (5) (see FIG. 3) and pushes the discharged water into the water recycling tank (14) through inflow tubing (18) and port (17). This job of separating mosquito eggs from the outflow water of the spawning tank is accomplished by the fine meshed screen (13) fixed at the bottom of the depressor bowl (11). The screen has an opening size of about one-fifth the size (e.g. about 1 mm) of aqueous-phase mosquitoes Mosquito eggs trapped below the mesh screen in the confining chamber (16) are eventually killed by drowning. The water refilling chamber (15) of the recycling tank (14) contains a fill valve (20) which adds new water to the water recycling tank (14) when water level in the water recycling tank falls below the outflow ports (9a). A low water level in the apparatus will cause damage to the water pump (21) if not corrected in time. The water recycling tank (14) has one or more outflow ports (9a) which are connected to the inflow ports (not shown in the drawing) of the spawning tank (5) (see FIG. 3). The water withdrawn from the spawning tank (5) eventually flows back to the spawning tank (5) by the action of the water pump (21) after leaving the mosquito eggs in the confining chamber (16).

FIG. 10 is a top view of the apparatus (22) with the spawning tank (5) and water recycling tank (14) affixed together by bulkhead fittings at water inflow ports (9) and outflow ports (9a). The water pump (21) moves water from the spawning tank (5) to the confining chamber (16) through a series of tubings (8 and 18) and water flow ports (7, 17). The water pump gets its power through an electric cord (24) which is connected to an electric outlet or a rechargeable battery. A timer (not shown in the drawing) is connected to the water pump to set operating time and time interval of the water pump (21). When electricity supply is interrupted for any reason and causes the water pump (21) to stop working, the apparatus (22) can still be operated by following the manual operating procedures described in the previous paragraphs.

FIG. 11 is the side view of the apparatus (22) in the automated operation mode. The spawning tank (5) and water recycling tank (14) are affixed together with bulkhead fitting at water inflow ports (9) and outflow ports (9a). New waters enter the water recycling tank (14) from a water supply pipe (19). A fill valve (20) (see FIG. 9) in the water recycling tank (14) opens when water level falls below the outflow port (7) of the spawning tank (5). The water pump (21) is powered either by an electric outlet or by a battery (e.g., a battery connected to a solar panel (not shown in the drawing)). The spawning tank cover (1) is equipped with multiple openings (4) for allowing entries of mosquitoes to lay eggs in the spawning tank (5). A meshed screen (3) is fixed on the top of the cover for preventing tree leaves and other airborne debris from falling in the spawning tank (5). The mesh screen (3) also provides shade to the spawning tank (5) to attract adult mosquitoes to the spawning tank (5). The mesh screen (3) may also be used to screen out filamentous algae and other living organisms when cultured green waters are added to the spawning tank. The mesh screen can be further used to filter out dead and living mosquito bodies when cleaning of spawning tank becomes necessary FIG. 12 is the perspective view of the apparatus (22) in the automated operation mode. Adult mosquitoes are drawn to the spawning tank (5) by the black or dark colored apparatus (22) and water moisture emitted from the entry holes (4). Mixtures of baking powders, sugars or other mosquito attractants can optionally be periodically added to the water of the spawning tank (5) to attract mosquitoes to the apparatus (22). Optionally, a dim solar light can provide additional attraction to the spawning tank (5) for mosquitoes. An electric water pump (21), connected to a timer (not shown in the drawing) moves water from the spawning tank (5) to the water recycling tank (14) and back to the spawning tank (5) after leaving the mosquito eggs in the confining chamber (16). The water pump (21) is powered either by an electric outlet or by a battery (e.g., a battery connected to a solar panel (not shown in the drawing)). A fill valve (20) can be actuated (e.g., automatically actuated) to facilitate flow of new water into the water refilling chamber (15) when the water level drops below the outflow port(s) (23) of the water refilling chamber (15). Because all water flow ports (7, 9, 9a, 23) of the apparatus (22) are placed at the same level, new waters added from the water refilling chamber (15) eventually flow to all water chambers (15, 16) including the spawning tank (5). On the top of the confining chamber (16) is a removable depressor bowl (11) which has a fine meshed screen fixed at the underside to serve as a barrier to keep mosquito eggs entrapped in the confining chamber (16) while allowing water to flow back to the spawning tank (5). On the side of the spawning tank (5), there is an outflow opening (6) covered with a fine meshed screen to allow excess water flowing out of the spawning tank (5) during raining events. One or more water inflow ports (9) on opposite side of the spawning tank outflow port (7) are connected to the outflow ports (9a) of the water recycling tank (14). New waters added to the water refilling chamber (15) from the fill valve (20) flow first to the water recycling tank (14) and continue flowing to the spawning tank (5). Water flow ports (9, 9a, 23) allow water flowing from one chamber to the other.

Experiment Studies and Conclusions

Figure 13:
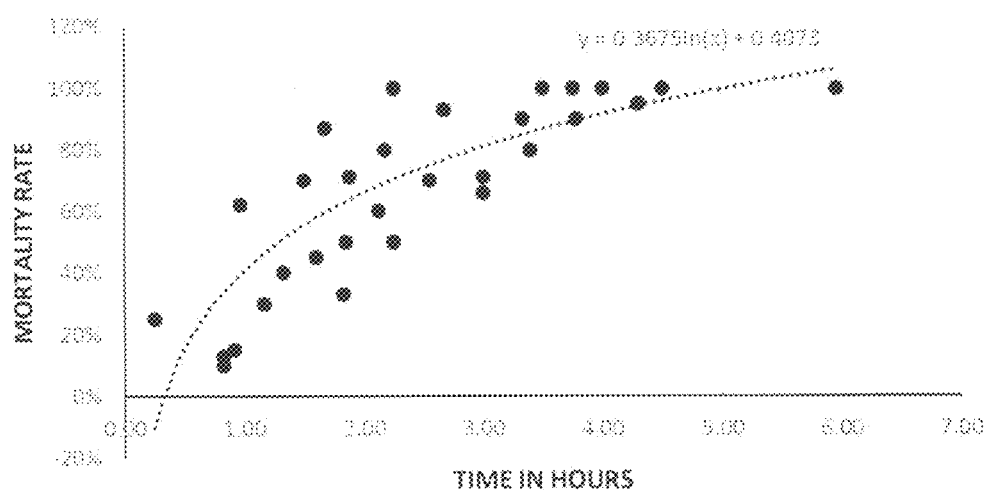
FIG. 13 is a graph of mortality rate of mosquito eggs at different time intervals.
Figure 14:
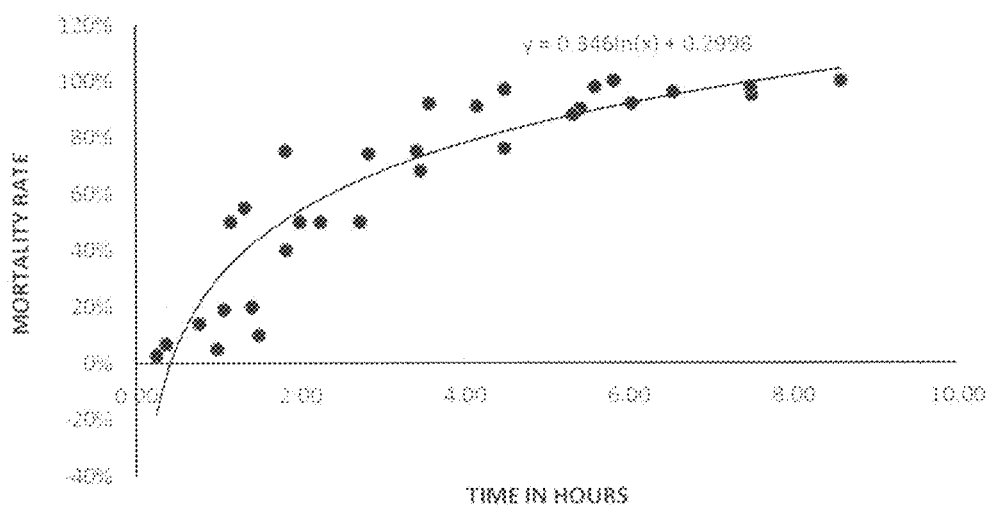
FIG. 14 is a graph of mortality rate of mosquito larvae at different time intervals.
Figure 15:
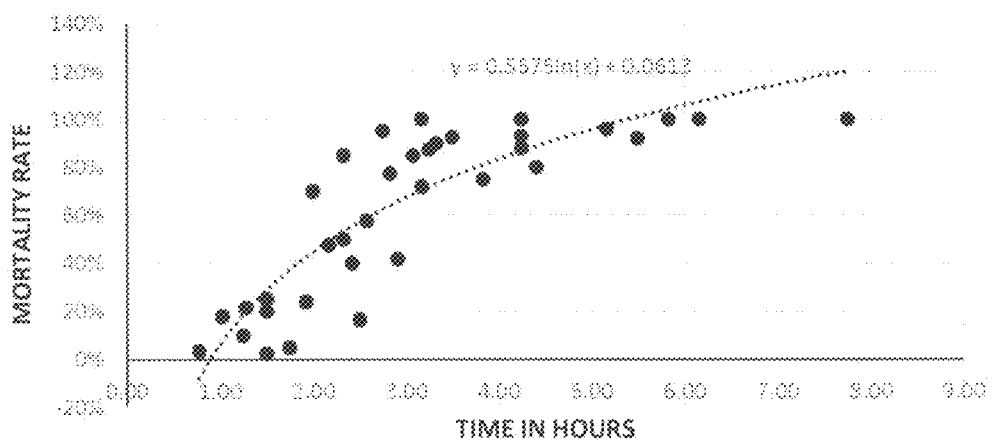
FIG. 15 is a graph of mortality rate of mosquito pupae at different time intervals.

The effectiveness of the mosquito egg eradication apparatus (22) was tested using the manual model of the apparatus. Mosquito eggs and other developing stages of mosquitoes, e.g., mosquito larvae and pupae, were also included in the tests to study eradicating effectiveness of the apparatus on other pre-adult stages of mosquitoes. A manual model of the apparatus (22) was used to collect mosquito eggs from the open field Mosquito larvae and pupae were raised from mosquito eggs collected from the open field. Results of the studies are presented in Graph 1 (FIG. 13), Graph 2 (FIG. 14) and Graph 3 (FIG. 15). The graphs are presented to show correlations between the elapsing time and the drowning mortality rates of different developing stages of mosquitoes. Results of multiple test trials show that the mosquito eradicating apparatus (22) is effective in eradicating all pre-adult stages of mosquitoes. Repeated test trials show that mosquito eggs take the shortest time to achieve a 90% drowning mortality rate when comparing to other pre-adult stages of mosquito. Data obtained from the test trials are used to construct trending curves using the Excel program. Mathematical equations derived from the trending curves are used to interpolate the drowning mortality rates and the elapsing times and vice versa. Test results show that mosquito eggs (Graph 1) take 3.82 hours to reach a 90% drowning mortality rate. The elapsing time of 90% drowning mortality rates for mosquito larvae and mosquito pupae are 5.67 and 4.51 hours respectively. Some variances in the drowning times are observed among testing mosquitoes due to uncontrollable factors. Differences in the biological backgrounds and ages of mother mosquitoes are two uncontrollable factors. Mosquito eggs collected from the open field often consist of different geniuses and species which will show different tolerances to low oxygen environments. Water temperatures and water qualities also impact the respiration rates and oxygen demands of the mosquito eggs. All these factors may affect the drowning time of individual mosquito eggs in the tests. Despise the variances observed among individual testing mosquitoes in some test groups, results of repeated test trials show that the mosquito egg eradicating apparatus can eradicate 90% of mosquito eggs in less than four hours. The apparatus has proven itself as an effective tool in eradicating mosquito eggs in the open field. The apparatus offers an efficient tool and method in controlling mosquito populations in a given environment.

While certain embodiments of the inventions have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:
1. A mosquito egg eradicating apparatus, comprising:
a spawning tank fillable with water;
a multi-purpose cover configured to be disposed on the spawning tank;
a water pump; and a water recycling tank having a mosquito egg confining chamber and a water refill chamber, wherein the water pump is configured to move mosquito eggs from the spawning tank to the confining chamber in the water recycling tank to drown the mosquito eggs, wherein the apparatus can be operated either manually or automatically with electric power, and wherein said spawning tank cover comprises one or more entry openings via which adult mosquitoes can enter the spawning tank to lay eggs therein, wherein the spawning cover comprises a screen mesh on a surface thereof configured to provide shade to the spawning tank and inhibit debris from falling into the spawning tank when the cover is disposed on the spawning tank, and wherein the spawning tank cover is configured to be at least partially inserted into the spawning tank when the apparatus is operated in manual mode, the screen configured to trap mosquito eggs below the water level in the spawning tank to drown the mosquitoes.

2. The apparatus of claim 1, wherein the spawning tank provides a spawning ground for adult mosquitoes to lay eggs in.

3. The apparatus of claim 1, wherein the spawning tank is configured to confine mosquito eggs when the apparatus is operating in the manual mode.

4. The apparatus of claim 1, wherein the spawning tank has one or more water flow openings on a side of the spawning tank that function as water overflow port during raining events.

5. The apparatus of claim 1, wherein the cover comprises a gasket disposed at least partially about a circumference of the cover at a location above the entry openings, the gasket configured to engage an inner surface of the spawning tank to inhibit mosquito eggs from floating to a water surface through the crevasse between a wall of the spawning tank and the cover.

6. The apparatus of claim 1, wherein the water recycling tank contains a confining chamber where mosquito eggs are trapped and drowned.

7. The apparatus of claim 6, wherein the water recycling tank further comprises a water refilling chamber and a fill valve automatically actuatable to allow additional water to be added to the water recycling tank when a water level drops below a predetermined level.

8. The apparatus of claim 7, further comprising a depressor bowl sized to fit into the confining chamber, the depressor bowl comprising a fine meshed screen on a surface thereof configured to retain mosquito eggs in the confining chamber below a water level in the confining chamber.

9. The apparatus of claim 8, wherein the depressor bowl comprises a gasket disposed at least partially about a circumference of the depressor bowl, the gasket configured to engage an inner surface of the confining chamber to inhibit mosquito eggs from floating to a water surface through the crevasse between a wall of the confining chamber and the depressor bowl.

10. A mosquito egg eradicating apparatus, comprising:

a spawning tank fillable with water and configured to provide a spawning ground for adult mosquitoes to lay eggs in; and a multi-purpose cover configured to be disposed on the spawning tank and comprising one or more entry openings via which adult mosquitoes can enter the spawning tank to lay eggs therein, a screen mesh on a surface thereof configured to provide shade to the spawning tank and inhibit debris from falling into the spawning tank when the cover is disposed on the spawning tank, and a gasket disposed at least partially about a circumference of the cover at a location above the entry openings, the gasket configured to engage an inner surface of the spawning tank to inhibit mosquito eggs from floating to a water surface through the crevasse between a wall of the spawning tank and the cover, and a water pump, and a water recycling tank having a mosquito egg confining chamber and a water refill chamber, the water pump configured to move mosquito eggs from the spawning tank to the confining chamber, wherein the spawning tank cover is configured to be at least partially inserted into the spawning tank when the apparatus is operated in manual mode, the screen configured to trap mosquito eggs below the water level in the spawning tank to drown the mosquito eggs.

11. The apparatus of claim 10, wherein the spawning tank has one or more water flow openings on a side of the spawning tank that function as water overflow port during raining events.

12. The apparatus of claim 10, wherein the spawning tank is configured to confine mosquito eggs when the apparatus is operating in a manual mode.

13. The apparatus of claim 10, further comprising a fill valve automatically actuatable to allow additional water to be added to the water recycling tank when a water level drops below a predetermined level.

14. The apparatus of claim 13, further comprising a depressor bowl sized to fit into the confining chamber of the water recycling tank, the depressor bowl comprising a fine meshed screen on a surface thereof configured to retain mosquito eggs in the confining chamber below a water level in the confining chamber.

15. The apparatus of claim 14, wherein the depressor bowl comprises a gasket disposed at least partially about a circumference of the depressor bowl, the gasket configured to engage an inner surface of the confining chamber to inhibit mosquito eggs from floating to a water surface through the crevasse between a wall of the confining chamber and the depressor bowl.

* * * * *